E. C. CARLSON.
COUPLING.
APPLICATION FILED FEB. 17, 1917.
1,355,450.
Patented Oct. 12, 1920.
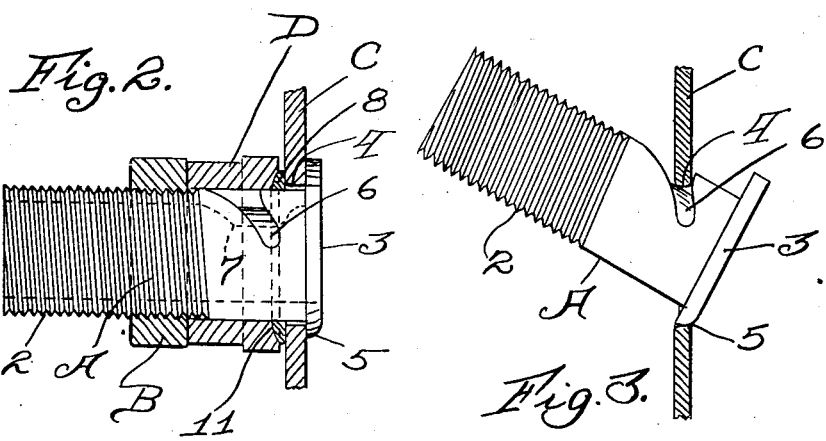
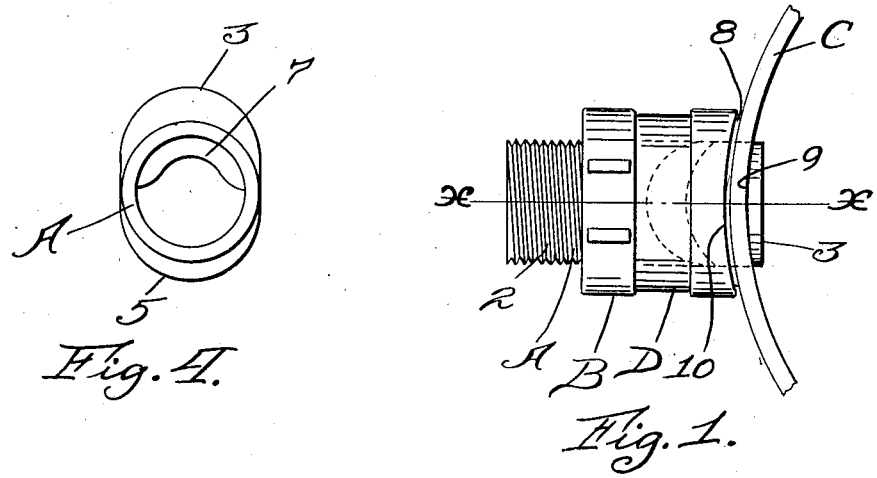
Inventor:
Elmer C. Carlson,
by: [signature]
Attorney.

UNITED STATES PATENT OFFICE.

ELMER CONRAD CARLSON, OF ST. PAUL, MINNESOTA, ASSIGNOR TO ALBERT B. CARLSON, OF ST. PAUL, MINNESOTA.

COUPLING.

1,355,450.  Specification of Letters Patent.  Patented Oct. 12, 1920.

Application filed February 17, 1917. Serial No. 149,154.

*To all whom it may concern:*

Be it known that I, ELMER CONRAD CARLSON, a citizen of the United States, residing at St. Paul, in the county of Ramsey and State of Minnesota, have invented a new and useful Improvement in Couplings, of which the following is a specification.

This invention relates to improvements in couplings of that class which is particularly adapted for connecting a pipe to the shell of a tank or other receptacle. The primary object of this invention is to provide improved means for easily and quickly making a pipe connection with a receptacle from the outside by simple and inexpensive means which will produce a liquid, steam, gas, or air tight union. Among further objects is the production of a coupling which can be effectively used by unskilled persons to produce a durable and tight joint.

In the accompanying drawing, forming part of this specification, Figure 1 is a plan of my invention and a detail of a tank to which my invention is shown applied; Fig. 2 is a section on the line X—X of Fig. 1 of part of the coupling, the remaining portion of the coupling being shown in full; Fig. 3 is a side elevation of part of my invention, the view being typical of the mode of applying the invention for use with a tank, and Fig. 4 is an end view of part of my improved coupling.

My invention comprises a short section of pipe fitting indicated by A having an exteriorly threaded end 2 on which a lock nut B is adapted to screw. This threaded end is adapted for connection with a main pipe or duct not shown by any usual coupling means. The opposite end of the pipe fitting from that which is threaded is formed with a head or shoulder 3. In use the pipe fitting is inserted with its head end passing through a circular opening 4 and into the tank or receptacle, a portion of which is indicated by C in the drawing, the head 3 being adapted for engagement back of the inner edge of said opening to act as a stop. The head 3 is elongated and the width of the narrow elongated portion is substantially the same diameter as that of the pipe fitting as illustrated clearly in Fig. 4.

One end 5 of the elongated head is rounded so that the fitting will more easily clear the side of said opening when the fitting is inserted in inclined position through the opening 4 as illustrated in Fig. 3 and tilted downwardly after the head has been inserted. In order that the fitting may be inserted through the opening 4 a clearance notch or groove 6 is formed in one side of the fitting, this notch slanting downwardly and with its lower end toward the head 3 and being of slightly greater width than the thickness of the shell C of the receptacle. The shape and inclination of this notch and its width allows the fitting to turn freely through the opening 4 and to be fully inserted through said opening. The inner surface of the fitting is formed with a lug 7 below the notch 6, so that the depth of the notch may be equal or greater if desired than the thickness of the shell of the receptacle without reducing the strength of the fitting. After the fitting has been inserted through the opening 4 it is tilted down into substantially horizontal position as illustrated in Fig. 2, and moved outwardly until its head 3 engages back of the inner edge of the opening 4. A gasket or packing ring 8 made of lead, soft material or any suitable material and of any suitable shape is then placed over the outer projecting portion of the fitting against the outer edge of the opening 4 and a collar D slid over the fitting. The nut B is then secured tightly on the fitting, thus clamping the fitting with the shell C tightly embraced between the inner surface of the head 3 and the packing ring 8, the collar D sliding upon the fitting but not turning when the nut is being set and jamming the gasket closely around the fitting and against the outer edge of the opening 4, thus producing a leak proof joint in an effective manner. The length of the collar D is sufficient to close the notch 6. It will be noted that the surface 9 of the head 3 and the surface 10 of the collar D are shaped to substantially conform with the contour of the shell C of the receptacle, but it is obvious that these surfaces may be flat or otherwise shaped to most effectively engage and produce a tight fitting joint between the receptacle and the coupling.

The inner edge of the collar D is formed with a seat 11 which most effectively engages the gasket to compress the latter firmly and close any space within the joint between the fitting and the shell of the receptacle.

In use the head end of the fitting is inserted through the opening 4, an edge of said opening being engaged in the notch 6 and the fitting tilted from inclined position as illustrated in Fig. 4 into substantially horizontal position as illustrated in Fig. 2. The fitting is then drawn outwardly until the head engages back of the inner edge around the opening 4 of the shell. The gasket 8 and the collar B are then next placed over the fitting and the nut B screwed firmly against the collar until the parts are drawn tightly compressed with the edge of the opening 4 closely embraced between the head 3 and the gasket 8. A leak proof joint is thus produced which is substantially permanent. It will be observed that the construction described provides an effective coupling which can be applied to any part of the receptacle from the outside through which an opening can be made.

In accordance with the patent statutes, I have described the principles of operation of my invention, together with the apparatus which I now consider to represent the best embodiment thereof, but I desire to have it understood that the construction shown is only illustrative, and that the invention can be carried out by other means, and applied to uses other than those above set forth within the scope of the following claims.

Having described my invention, what I claim as new and desire to protect by Letters Patent is:

1. A coupling for connecting a pipe with a circular opening in a receptacle shell from the exterior, comprising, in combination, a pipe fitting having a body threaded on one end and formed with a head on its opposite end said body being cylindrical between said head and threaded end and having a clearance groove in its side adjacent to said head adapted to receive the edge portion of said circular opening and allow the head portion of said fitting to be inserted into said opening by a tilting movement, said groove slanting inwardly and downwardly toward said head and having sides diverging outwardly to give greater clearance, a sleeve on said fitting covering said groove, a gasket between said sleeve and the edge of said circular opening in said receptacle and a nut threaded on said fitting and serving to tighten said head and sleeve with said gasket compressed between said fitting and the edge of said circular opening.

2. A coupling for connecting a pipe with a circular opening in a receptacle shell from the exterior, comprising, in combination, a pipe fitting having a body threaded on one end and formed with an elongated head on its opposite end, said body being cylindrical between said head and threaded end and of a diameter substantially the same as the diameter of said opening and the least width of said head, said body being formed with a deep notch in its side a short distance from said head adapted to receive the edge of said circular opening and allow the head portion of said fitting to be freely inserted through said opening by a tilting movement, a sleeve on said fitting covering said notch, a gasket between said sleeve and the edge of said circular opening in said receptacle and a nut threaded on said fitting and serving to tighten said head and sleeve with said gasket compressed between said fitting and the edge of said circular opening.

In testimony whereof, I have signed my name to this specification.

ELMER CONRAD CARLSON.